US008548780B2

(12) United States Patent
Skelly et al.

(10) Patent No.: US 8,548,780 B2
(45) Date of Patent: Oct. 1, 2013

(54) METHOD FOR PREDICTING THE DYNAMIC BEHAVIOR OF AN AIRCRAFT STRUCTURE

(75) Inventors: John Skelly, Mons (FR); Thien Phu Vo Hoang, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 417 days.

(21) Appl. No.: 12/990,654

(22) PCT Filed: Jun. 3, 2009

(86) PCT No.: PCT/FR2009/000643
§ 371 (c)(1),
(2), (4) Date: Nov. 2, 2010

(87) PCT Pub. No.: WO2010/000958
PCT Pub. Date: Jan. 7, 2010

(65) Prior Publication Data
US 2011/0046933 A1 Feb. 24, 2011

(30) Foreign Application Priority Data
Jun. 5, 2008 (FR) ..................................... 08 03115

(51) Int. Cl.
*G06G 7/48* (2006.01)
*G06G 7/50* (2006.01)

(52) U.S. Cl.
USPC .................................................. 703/8; 703/9

(58) Field of Classification Search
USPC ........................................................ 703/8, 9
See application file for complete search history.

(56) References Cited

U.S. PATENT DOCUMENTS

| 3,626,510 | A | * | 12/1971 | Kauzlarich et al. | ............... 384/1 |
| 4,867,655 | A | * | 9/1989 | Barbic et al. | ................. 417/407 |
| 4,947,639 | A | | 8/1990 | Hibner et al. | |
| 5,201,585 | A | | 4/1993 | Gans et al. | |
| 2004/0245388 | A1 | | 12/2004 | Kubica et al. | |

FOREIGN PATENT DOCUMENTS

GB 2 218 751 11/1989

OTHER PUBLICATIONS

Siew et al.; Evaluation of various fluid-film models for use in the analysis of squeeze film dampers with a central groove; Tribology International 35 (2002) 533-547.*

Inayat-Hussai et al.; On the bifurcations of a rigid rotor response in squeeze-film dampers; Journal of Fluids and Structures 17 (2003) 433-459.*

(Continued)

*Primary Examiner* — Hugh Jones
(74) *Attorney, Agent, or Firm* — Oblon, Spivak, McClelland, Maier & Neustadt, L.L.P.

(57) ABSTRACT

A method for predicting dynamic behavior of an aircraft structure, the aircraft including at least one rotary device including at least one rotor guided in rotation by at least one fixed-bracket bearing containing a shock-absorbing fluid film. The method includes using a global digital model of the aircraft structure including a basic digital model of each rotary device, generating a non-linear digital model of each shock-absorbing film (for example by developing a cavitation-free model and a model with cavitation), integrating the model of each shock-absorbing film with the global model, applying interference to at least one rotor of a rotary device, and calculating the vibration frequency of at least one rotor of each rotary device and the corresponding frequency of the vibrations generated in a critical portion of the aircraft structure.

9 Claims, 3 Drawing Sheets

(56) References Cited

OTHER PUBLICATIONS

Barrett et al.; Steady-State and Transient Analysis of a Squeeze Film Damper Bearing for Rotor Stability; NASA Contractor Report CR-2548; 110 pages; 1975.*

Kirk Et Al.; Nonlinear Transient Analysis of Multi-Mass Flexible Rotors Theory and Applications; Nasa Contractor Report Cr-2300; 266 Pages; 1973.*

Fernandes; Dynamic Analysis of Mechanical Systems With Imperfect Kinematic Joints; Phd Thesis Universidade Do Minho; 2004; 282 pages.*

Qui; A theoretical and experimental study on dynamic characteristics of journal bearings; Ph D Thesis University of Wollongong Thesis Collections; 1995; 397 pages.*

Holmes et al.; The Spectral Analysis of an Aero-Engine Assembly Incorporating a Squeeze-Film Damper; In NASA, Lewis Research Center, Rotordynamic Instability Problems in High-Performance Turbomachinery, 1988 p. 61-86 (See N89-22891 16-37); 1989; pp. 61-86.*

International Search Report issued Jan. 13, 2011 in PCT/FR2009/000643 (with Translation of Category of Cited Documents), pp. 1-5.

Fabiano Assis Rodrigues, "Étude de la Dynamique Non Linéaire d'Amortisseurs du Type Squeeze Film", École Centrale de Lyon, vol. 2003-08, XP007916086, Feb. 2003, pp. 1-248 (with fifteen additional pages).

Olivier Bonneau, et al., "Non-linear behavior of a flexible shaft partly supported by a squeeze film damper", WEAR, vol. 206, XP-002612547, 1997, pp. 244-250.

Anonyme: "Méthodes Avancées en Ingénierie MécAnique", MAIA, XP-002612623, Oct. 8, 2003, pp. 1-16.

Villa, C., et al., "Stability and vibration analysis of a complex flexible rotor bearing system," Communications in Nonlinear Science and Numerical Simulation, Elsevier, vol. 13, pp. 804-821, (Sep. 14, 2006).

French Search Report issued Jan. 9, 2009 in corresponding French Patent Application No. 08 03115, filed Jun. 5, 2008, pp. 1-2.

* cited by examiner

METHOD FOR PREDICTING THE DYNAMIC BEHAVIOR OF AN AIRCRAFT STRUCTURE

The present invention relates to a method for predicting the dynamic behavior of an aircraft structure, making it possible to predict the vibrations undergone by at least part of this structure, with a view to preventing or alleviating them, by taking into account vibrations induced by the rotor or rotors of certain rotating devices of the aircraft, such as engines, an electrical generator, etc.

In an aircraft equipped with engines having rotor(s) (thrust nozzles, turbojet engines, turboprop engines, etc.), any disequilibrium of a rotating element of an engine generates vibrations which are transmitted to the engine casing and propagated in the aircraft structure to the fuselage. The subsequent vibrations of the fuselage detract from the comfort of the passengers, fatigue the structure of the aircraft and may jeopardize safety by making it difficult to read flight instruments.

An aircraft engine having rotor(s) generally comprises one or more rotors, each provided with a shaft and turbine blades or vanes and/or a compressor, the said shaft being guided in rotation by at least two bearings, generally of rolling type. Each bearing comprises, among other components, a bearing cage and a bearing bracket receiving the said cage. This bearing bracket may be fixed, or in other words be mounted in fixed in the engine casing or may be an integral part thereof, or may be rotating (case of a bearing between two concentric shafts). During operation, the vibrations of the rotor are at least partly transmitted to each of the bearing brackets carrying it. In the case of a fixed bearing bracket, the vibrations undergone by the bearing bracket are transmitted directly to the airplane structure.

In order to limit the transmission of vibrations between a rotor of a rotating device and the aircraft structure, it is known to form a film of oil or other lubricating fluid between the bearing cage and the bearing bracket of each fixed-bracket bearing carrying the said rotor. This film, referred to as damping film in the present description, is also known commonly as "Squeeze Film Damper" or SFD. When the rotor and consequently the bearing becomes radially displaced, the damping film is compressed between the bearing cage and the bearing bracket. The increased pressure of the fluid in the compression zone exerts a reaction force on the bearing cage, thus tending to return it to a central position.

BACKGROUND

Thus the known damping films have the effect of passively damping the vibrations transmitted to the airplane structure, albeit without succeeding in eliminating them. The damping achieved depends in particular on the vibration frequency of the rotor. The inventors observed that this damping decreased for elevated frequencies, especially above 20 Hz, and that it was also slight for frequencies close to 5 Hz.

A problem arises when the damping achieved is slight precisely for some frequencies that also correspond to resonance modes of the airplane fuselage. In this case, the slightly damped vibrations undergone by the fixed bearing brackets may induce, under certain flight conditions, fuselage vibrations sufficiently strong to affect the comfort and safety of the passengers. This problem has been observed, for example, in certain aircraft having a fuselage of great length and relatively small diameter, for engine vibration frequencies on the order of 5 Hz and in a certain part of the flight range corresponding to flying speeds faster than 350 km/h (or approximately 190 KCAS—"Knots Calibrated AirSpeed"—) and altitudes higher than 6,000 m.

Since the efficacy of damping films of SFD type is imperfect, supplementary active control measures have been employed to reduce the fuselage vibrations induced by motors having rotor(s). Thus, EP 1375343 describes a device that makes it possible to activate the aircraft control surfaces in response to vertical and horizontal accelerations undergone by at least two engines symmetric relative to the fuselage. The accelerations undergone by each of the two engines are measured by accelerometers positioned on the engine, and the control instruction defining the orientation of the control surfaces is calculated by means of the measured accelerations and of a table of relations pre-established on the basis of the aeroelastic model of the aircraft.

Such a device makes it possible to reduce the fuselage vibrations even more. Nevertheless, it is still insufficient to guarantee a high level of passenger safety and comfort in a large-size aircraft, where strong vibrations may be felt from 5 Hz on in cruising phase, especially in the case of turbulences.

In addition, other problems arise:
to date no means exists for predicting with certainty the frequency and amplitude of vibrations induced by the engines or other rotating devices on the fuselage of a new aircraft version; these vibrations are evaluated during test flights of the aircraft, in a stage when any modification of the aircraft becomes complex,
because of this fact, the designers are incapable of predicting, upstream, adequate correction solutions that lead to only few structural modifications of the aircraft if such vibrations occur.

SUMMARY

The invention is intended to alleviate these disadvantages by proposing an analysis method making it possible to predict with certainty the effects that vibrations undergone by at least one rotor of a rotating device have on the structure of an aircraft and especially on the fuselage structure of the aircraft.

To accomplish this, the invention relates to a method for predicting the dynamic behavior of an aircraft structure, the said aircraft comprising at least one rotating device, referred to as dimensioning rotating device, whose effect on at least one part—especially the fuselage—referred to as critical part, of the aircraft structure is wished to be evaluated, each dimensioning rotating device being provided with one or more rotors, including at least one rotor guided in rotation by at least one bearing, referred to as fixed-bracket bearing, which is provided with a fixed bearing bracket, a conjugate bearing cage inserted inside the said bearing bracket and a fluid film, referred to as damping film, confined between the said bearing cage and the said bearing bracket. According to this method, a numerical model of the aircraft structure, referred to as global model, is used, which comprises, for each dimensioning rotating device, a numerical model, referred to as basic model, of the said dimensioning rotating device, capable of furnishing at least the frequency of vibration of one rotor of the said dimensioning rotating device according to the speed of rotation of the said rotor and of perturbations undergone by the rotor.

The method according to the invention is characterized in that:
for each fixed-bracket bearing, a non-linear numerical model of the damping film of the said bearing is created,
for each dimensioning rotating device, the model of the damping film of each fixed-bracket bearing of the dimensioning rotating device is integrated in the basic model of the said dimensioning rotating device in such a way as to form a numerical model, referred to as model with film, of the said dimensioning rotating device in the global model, in the global model, perturbations are applied to at least one rotor of at least one dimensioning rotating device, by means of the global model, the vibration frequency of at least one rotor of each dimensioning rotating device and the corresponding frequency of the vibrations induced in the critical part of the aircraft structure are calculated with a view to alleviating or preventing the said induced vibrations.

The aforesaid perturbations may comprise perturbations representative of the gyroscopic effect and of the unbalance of each rotor of the dimensioning rotating device. It is to be noted that these perturbations may be applied to the basic model of the said dimensioning rotating device (or in other words before integration of the damping film models in the global model) or preferably in the model with film of the said device. In other words, the steps defined in the second and third paragraphs above may be executed in one order or the other.

The invention extends to a computer program stored on an information medium, the said program comprising instructions permitting employment of the method according to the invention when this program is loaded and executed in an information technology system. The invention also relates to an information technology system comprising means adapted to employ the method according to the invention.

Thus the invention is primarily based on taking into account the influence of damping films on the dynamic response of the aircraft structure in the presence of perturbations undergone by the rotors of certain rotating devices. The inventors have in fact observed that these damping films significantly modified the vibration frequency response of the rotor or rotors of the rotating device, and therefore the frequency of vibrations induced in the aircraft structure, particularly for low frequencies.

Optionally and advantageously, the method according to the invention also has one or more of the following characteristics.

The global model and the basic model of each dimensioning rotating device used are initially finite elements models. Each created damping film model is initially a matrix model or a finite elements model or a state space. Advantageously, each of these models is transformed into state spaces before the model with film of each dimensioning rotating device is formed in the global model transformed in this way.

As explained in the foregoing, a basic model capable of furnishing at least the vibration frequency of one rotor of the said dimensioning rotating device according to the speed of rotation of the said rotor is used for each dimensioning rotating device. Preferably a basic model capable of also furnishing the amplitude of vibration of this rotor is used. More preferably, a basic model capable of furnishing the frequency and amplitude of vibration of each rotor of the dimensioning rotating device according to the speed of rotation of each rotor of the said device is used.

Advantageously, a value to be imposed on at least one parameter of the said dimensioning rotating device or if necessary of the aircraft structure is determined according to the speed of rotation of at least one rotor of a dimensioning rotating device, in such a way as to prevent the frequency of the vibrations induced in the critical part of the aircraft structure from coinciding with a natural mode of the said critical part. Preferably, for each damping film of each dimensioning rotating device, a value to be imposed on at least one parameter of the said damping film or of the corresponding bearing is determined according to the speed of rotation of at least one rotor of a dimensioning rotating device, in such a way as to prevent the frequency of the vibrations induced in the critical part of the aircraft structure from coinciding with a natural mode of the said critical part. This parameter may be chosen from among: the fluid supply pressure of the damping film, the length of the bearing, the radial clearance between the bearing cage and the bearing bracket of the said bearing (the damping film model being created in such a way as to take into account at least one—and preferably all—of these parameters). The value determined for this parameter may be the same for all of the speeds of rotation of the rotors of the dimensioning rotating devices, especially if the parameter is a structural parameter (bearing length, radial clearance, etc.), which is difficult if not impossible to modify once the dimensioning device has been constructed. As a variant, the value of the parameter may vary according to the speed of rotation of at least one rotor of at least one dimensioning rotating device if the parameter is adjustable during flight (fluid supply pressure).

In all of the description hereinafter, "eccentricity of a bearing", denoted by $\epsilon$, is understood as the ratio of the distance separating, at instant t, the axis of the bearing cage and the axis of the bearing bracket over the radial clearance between the bearing cage and the bearing bracket (this radial clearance corresponding to the clearance between the external peripheral face of the bearing cage and the internal peripheral face of the bearing bracket at rest, when the bearing cage is centered in the bearing bracket and their respective axes coincide).

Each damping film model is created on the basis of one or more of the following hypotheses:

the fluid is Newtonian, without inertia, incompressible and of homogeneous viscosity;

the damping film is modeled by a plane film; this hypothesis may be applied taking into account the fact that the thickness or radial dimension and the length or dimension in the axial direction of the rotating element of the film are very small relative to its radius of curvature;

the eccentricity of the bearing is considered to be the same over the entire length of the bearing, this eccentricity being equal to the eccentricity of the bearing in the median transversal plane of the said bearing; the forces exerted by the damping film on the bearing cage are therefore the same at every point of a given line parallel to the axis of the said bearing cage; this hypothesis makes it possible to reduce the damping film model to a two-dimensional model (the "z" coordinate in the axial direction of the bearing is not involved);

every displacement of the bearing cage is resolved into a radial component and a tangential component; the radial component of a displacement of the bearing cage is modeled by a displacement along an axis normal to the plane of the modeled film; it induces a distribution of fluid pressures, such as modeled, that is symmetric relative to this normal axis; the tangential component of a displacement of the bearing cage is modeled by a sliding along an axis contained in the plane of the modeled film; it induces a distribution of fluid pressures, such as modeled, that is antisymmetric relative to the plane normal to this axis passing through the point of application of the sliding.

Each damping film model is created by considering that cavitation phenomena may occur. Thus, in a preferred version, the invention is based secondarily on the creation of a totally new damping film model that takes into account cavitation phenomena.

To create each damping film model, one model without cavitation, which assumes that no cavitation phenomenon is occurring, and one model with cavitation, which assumes that cavitation phenomena are occurring, are created on the basis of the following hypotheses:

- because of the unbalance of the rotor or rotors carried by the bearing, the axis of the bearing cage is eccentric relative to the axis of the bearing bracket and it undergoes rotation centered around the said axis of the bearing bracket, in such a way that the radial component $\dot{\epsilon}$ of the speed of the bearing cage is considered to be zero,
- in the model with cavitation, every aforesaid negative pressure value is replaced by zero,
- in the model with cavitation, a gas bubble is formed over half of the film, or in other words over an angle equal to $\pi$ diametrically opposite the axis of the bearing cage, as soon as the function $$\Gamma(\theta, \varepsilon) = \frac{\varepsilon \cdot \sin\theta}{(1 + \varepsilon \cdot \cos\theta)^3}$$

at a point of the film indexed by the angle $\theta$ when the axis of the bearing cage is situated at $\theta=\pi/2$, is greater than a critical value $$\Gamma c = \frac{4 \cdot Pc \cdot C^2}{6 \cdot \mu \cdot L^2 \cdot \Phi},$$

where C is the radial clearance between the bearing cage and the bearing bracket,
$\epsilon$ is the eccentricity of the bearing (as defined above),
Pc is the critical cavitation pressure, equal to the fluid supply pressure of the
damping film minus the ambient pressure,
$\mu$ is the dynamic viscosity of the fluid,
L is the length of the bearing,
$\Phi$ is the tangential speed of the bearing cage,
taking the foregoing hypotheses into account, the forces exerted by the damping film on the bearing cage, as well as the stiffnesses and damping coefficients of the said damping film, are given by the following formulas:

| | model without cavitation | model with cavitation |
|---|---|---|
| $F_r$ | 0 | $\dfrac{R \cdot L^3 \cdot \mu}{C^3} \dfrac{2 \cdot \varepsilon^2 \cdot \Phi}{(1-\varepsilon^2)^2}$ |
| $F_t$ | $\dfrac{\pi \cdot R \cdot L^3 \cdot \mu}{C^2} \dfrac{\varepsilon \cdot \Phi}{(1-\varepsilon^2)^{3/2}}$ | $\dfrac{R \cdot L^3 \cdot \mu}{C^3} \dfrac{\pi \cdot \varepsilon \cdot \Phi}{2 \cdot (1-\varepsilon^2)^{3/2}} + Fs$ |
| $C_{rr}$ | 0 | 0 |
| $C_{tt}$ | $\dfrac{\pi}{(1-\varepsilon^2)^{3/2}}$ | $\dfrac{\pi}{2 \cdot (1-\varepsilon^2)^{3/2}}$ |
| $C_{rt}$ | 0 | $\dfrac{2 \cdot \varepsilon}{(1-\varepsilon^2)^2}$ |
| $C_{tr}$ | 0 | 0 |

-continued

| | model without cavitation | model with cavitation |
|---|---|---|
| $K_{rr}$ | 0 | $\dfrac{2 \cdot \varepsilon \cdot \Phi}{(1-\varepsilon^2)^2}$ |
| $K_{tt}$ | 0 | 0 |
| $K_{rt}$ | 0 | 0 |
| $K_{tr}$ | 0 | 0 | where Fs is a force relative to the fluid supply pressure of the damping film. At constant supply pressure, this force Fs is constant.

To form the model with film of each dimensioning rotating device:

- a model, referred to as model with damping, of the dimensioning rotating device, capable of furnishing the vibration frequency of at least one rotor, referred to as analyzed rotor, of the dimensioning rotating device and the eccentricity of each fixed-bracket bearing of this rotor according to the speed of rotation of the said analyzed rotor is used, the said model with damping being formulated from the basic model of the dimensioning rotating device in such a way as to simulate damping—preferably linear—at least at each of the fixed-bracket bearings of the analyzed rotor,
- a value, referred to as value with cavitation, of the vibration frequency of the analyzed rotor, is calculated for each speed of rotation of the said rotor, in the following manner:
  - for each fixed-bracket bearing of the analyzed rotor, an initial value of the eccentricity of the said bearing is chosen,
  - for each fixed-bracket bearing of the analyzed rotor, the matrix of damping coefficients of the damping film of the said bearing furnished by the model with cavitation of the said damping film is calculated for the chosen initial value of the eccentricity of the said bearing,
  - a loop for physical verification of the eccentricities of the fixed-bracket bearings of the analyzed rotor is constructed on the model with damping of the dimensioning rotating device, by using initially, as matrix of damping coefficients of each bearing, the previously calculated matrix of damping coefficients of the corresponding damping film, then increasing the value of these coefficients in each cycle of the loop, until the value of eccentricity of the bearing furnished by the model with damping of the dimensioning rotating device is smaller than 1 for each bearing;
  - for each fixed-bracket bearing of the analyzed rotor, the matrix of damping coefficients and the matrix of stiffnesses of the damping film of the said bearing furnished by the model with cavitation of the said damping film are calculated for the value of the eccentricity of the bearing established at the end of the physical verification loop,
  - a loop of convergence of the eccentricities of the fixed-bracket bearings of the analyzed rotor is constructed on the model with damping of the dimensioning rotating device,
    - by using initially, as matrix of the damping coefficients of each bearing, the previously calculated matrix of damping coefficients of the damping film of the said bearing and, as matrix of stiffnesses of each bearing, the sum of the matrix of stiffnesses of the bearing furnished by the basic model of the dimensioning rotating device and of the previously calculated matrix of stiffnesses of the damping film of the said bearing, then by replacing these matrices in each cycle of the loop respectively by the matrix of damping coefficients of the damping film of the said bearing furnished by the model with cavitation of the said film for the value of eccentricity of the bearing established in the preceding cycle, and by the sum of the matrix of stiffnesses of the bearing furnished by the basic model of the dimensioning rotating device and the matrix of stiffnesses of the damping film of the said bearing furnished by the model with cavitation of the said film for the value of eccentricity of the bearing established in the preceding cycle, and so on until the value of eccentricity furnished for each bearing by the model with damping of the dimensioning rotating device converges;

the value, referred to as value with cavitation, of the vibration frequency of the analyzed rotor furnished by the model with damping of the dimensioning rotating device at the end of the convergence loop is recorded for each speed of rotation of the said rotor;

similarly, a value, referred to as value without cavitation, of the vibration frequency of the analyzed rotor is calculated for each speed of rotation of the said rotor; in other words:

for each fixed-bracket bearing of the analyzed rotor, an initial value of the eccentricity of the said bearing is chosen, for each fixed-bracket bearing of the analyzed rotor, the matrix of damping coefficients of the damping film of the said bearing furnished by the model with cavitation of the said damping film is calculated for the chosen initial value of the eccentricity of the said bearing, a loop for physical verification of the eccentricities of the fixed-bracket bearing of the analyzed rotor is constructed on the model with damping of the dimensioning rotating device, by using initially, as matrix of damping coefficients of each bearing, the previously calculated matrix of damping coefficients of the corresponding damping film, then increasing the value of these coefficients in each cycle of the loop, until the value of eccentricity of the bearing furnished by the model with damping of the dimensioning rotating device is smaller than 1 for each bearing;

for each fixed-bracket bearing of the analyzed rotor, the matrix of damping coefficients and the matrix of stiffnesses of the damping film of the said bearing furnished by the model with cavitation of the said damping film are calculated for the value of the eccentricity of the bearing established at the end of the physical verification loop, a loop of convergence of the eccentricities of the fixed-bracket bearings of the analyzed rotor is constructed on the model with damping of the dimensioning rotating device, by using initially, as matrix of the damping coefficients of each bearing, the previously calculated matrix of damping coefficients of the damping film of the said bearing and, as matrix of stiffnesses of each bearing, the sum of the matrix of stiffnesses of the bearing furnished by the basic model of the dimensioning rotating device and of the previously calculated matrix of stiffnesses of the damping film of the said bearing, then by replacing these matrices in each cycle of the loop respectively by the matrix of damping coefficients of the damping film of the said bearing furnished by the model without cavitation of the said film for the value of eccentricity of the bearing established in the preceding cycle, and by the sum of the matrix of stiffnesses of the bearing furnished by the basic model of the dimensioning rotating device and the matrix of stiffnesses of the damping film of the said bearing furnished by the model without cavitation of the said film for the value of eccentricity of the bearing established in the preceding cycle, and so on until the value of eccentricity furnished for each bearing by the model with damping of the dimensioning rotating device converges;

the value, referred to as value without cavitation, of the vibration frequency of the analyzed rotor furnished by the model with damping of the dimensioning rotating device at the end of the convergence loop is recorded for each speed of rotation of the said rotor;

to calculate the value of the vibration frequency of the analyzed rotor for each speed of rotation of the said rotor, a percentage of the value with cavitation of the previously calculated vibration frequency and a complementary percentage of the value without cavitation of the previously calculated vibration frequency are added.

To evaluate these percentages, it is possible, for example, to perform cross-checks with vibration frequency measurements performed in flight on the dimensioning rotating devices of existing aircraft. It is also possible, as a variant or combination, to evaluate these percentages by extrapolation, on the one hand from vibration frequency measurements performed on each of the dimensioning rotating devices on test benches on the ground, and on the other hand from numerical models reflecting the conditions under which these measurements were made (numerical model of the rigid mast carrying the dimensioning rotating device, etc.).

In the usual manner, global aerodynamic loads are applied to the global model. Advantageously, each created damping film model is integrated into the global model after application of the said global aerodynamic loads.

BRIEF DESCRIPTION OF THE DRAWING

Other details and advantages of the present invention will become apparent upon reading the following description, which is given with reference to the attached schematic drawings and relates to a preferred embodiment, furnished by way of non-limitative example. In these drawings.

DETAILED DESCRIPTION

Figure 1:
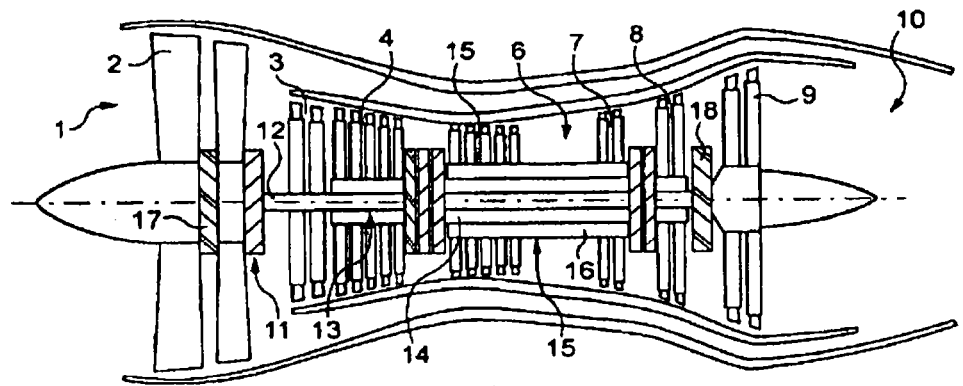
FIG. 1 is a schematic view in longitudinal section of a turbojet engine of an aircraft.

Certain known airplanes or other aircraft comprise engines having rotors, such as double-spool or triple-spool turbojet engines. FIG. 1 illustrates a triple-spool turbojet engine, comprising in the usual manner an air intake 1, a compression zone provided with a large-diameter fan and a plurality of compressor stages 3, 4, 5, a combustion chamber 6, a gas-expansion zone provided with a plurality of turbines 7, 8, 9, and an ejection nozzle 10. Such a turbojet engine comprises:

- a first rotor 11, referred to as low-pressure rotor, comprising fan 2, low-pressure compressor 3, low-pressure turbine 9 and a first shaft 12 carrying the aforesaid elements,
- a second rotor 13, referred to as medium-pressure rotor, comprising medium-pressure compressor 4, medium-pressure turbine 8 and a second shaft 14 carrying the aforesaid elements,
- a third rotor 15, referred to as high-pressure rotor, comprising high-pressure compressor 5, high-pressure turbine 7 and a third shaft 16 carrying the aforesaid elements.

Shafts 12, 14 and 16 are concentric. They are carried and guided in rotation by bearings such as rolling bearings (with balls, rollers or needles). Certain of these bearings are disposed between two shafts, meaning between two rotating elements; they are therefore provided with rotating bearing brackets. Others are provided with bearing brackets mounted fixed in the casing of the turbojet engine. Such is the case of bearings 17 and 18 of low-pressure rotor 11.

Figure 2:
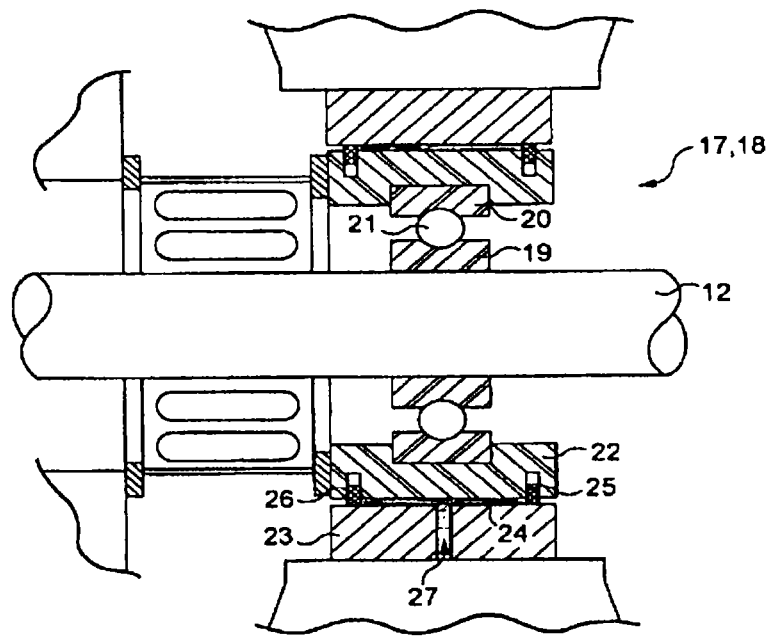
FIG. 2 is a schematic view in longitudinal section of a fixed-bracket bearing of the turbojet engine of FIG. 1.

As illustrated in FIG. 2, each fixed-bracket bearing 17, 18 comprises an internal race 19 integral with shaft 12, an external race 20, a ball bearing 21 seated between internal and external races 19 and 20, and a bearing cage 22 receiving external race 20. In addition, it comprises a bearing bracket 23 mounted fixed in the turbojet engine. A key (not illustrated) integral with bearing bracket 23 penetrates into a conjugate groove of bearing cage 22 to prevent rotation thereof. Finally, each bearing 17, 18 comprises an oil film 24 under pressure, referred to as damping film, formed between bearing cage 22 and bearing bracket 23. For this purpose, two end seals 25 and 26 are disposed between the bearing bracket and the bearing cage, at the axial ends of the bearing. The average oil pressure in the film is maintained at a given supply pressure, by virtue of an oil-supply duct 27 passing through bearing bracket 23.

The method according to the invention makes it possible to predict the vibrations induced in the airplane fuselage by the rotors of the turbojet engines of the airplane. In the present invention, it is primarily considered that the vibrations induced in the airplane structure by the rotors of a turbojet engine such as that illustrated in FIG. 1 are substantially due to the vibrations undergone by low-pressure rotor 11 of the said turbojet engine.

Figure 3:
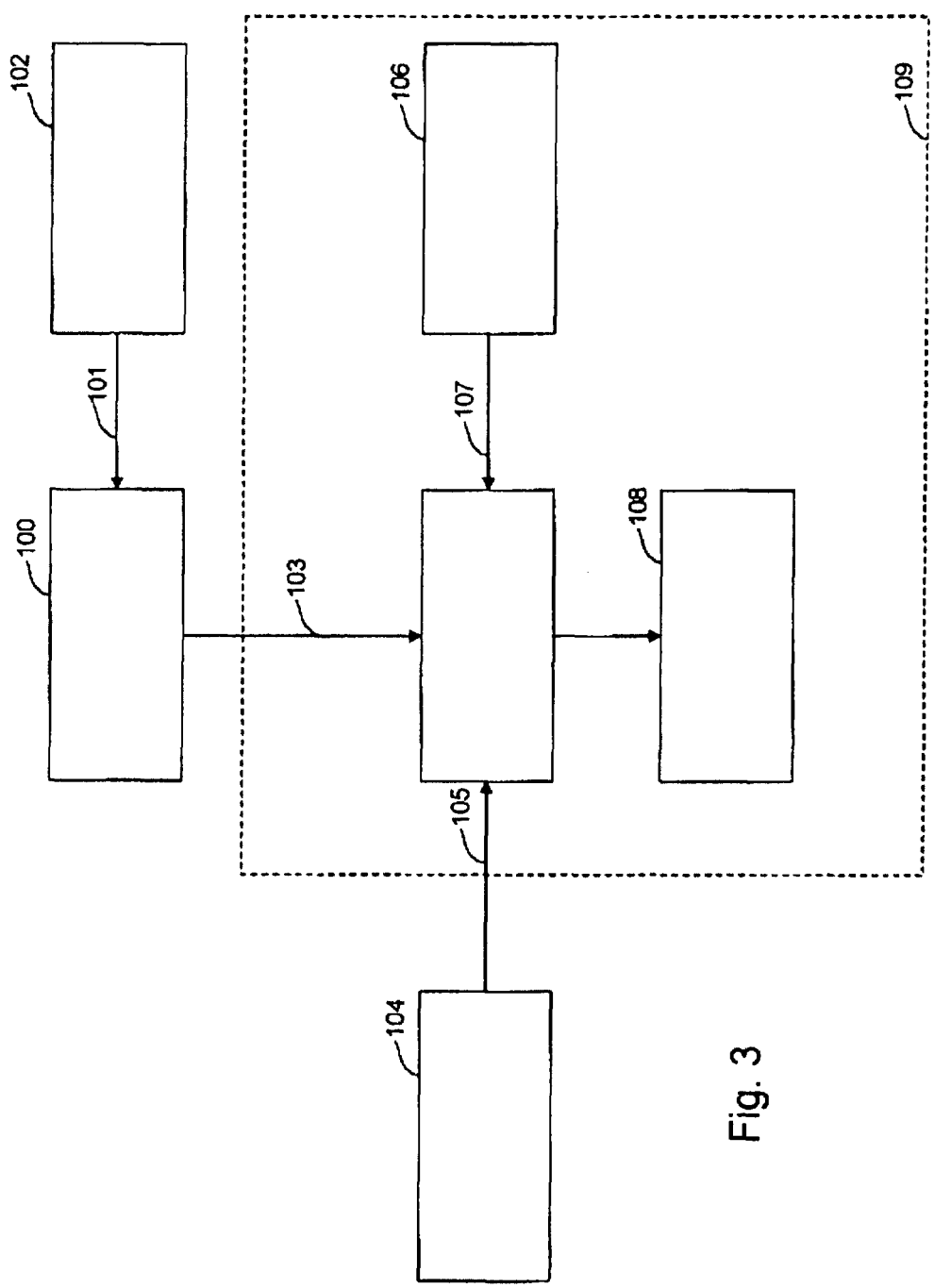
FIG. 3 is a functional organization diagram representing an embodiment of the method according to the invention.

The method according to the invention comprises the following steps (see FIG. 3):

- use of a numerical model 100 representing the aircraft structure, referred to as global model. This global model may be a pre-existing model or a model created specifically in connection with the method according to the invention. It is, for example, a finite elements model. This model comprises in particular the following subsets: a numerical model of the aircraft fuselage, a numerical model of each wing of the aircraft, a numerical model, referred to as basic model, of each turbojet engine of the aircraft, a numerical model of each pylon connecting a turbojet engine to the ribs of the wing group, etc. Taking into account the influence of low-pressure rotor 11 on the vibrations induced in the airplane structure, the basic model of each turbojet engine is advantageously a model formulated in such a way as to furnish at least the eccentricity of each fixed-bracket bearing 17, 18 and the vibration frequency of low-pressure rotor 11 for each speed of rotation N1 of the said low-pressure rotor. Preferably it is also formulated in such a way as to furnish the amplitude of vibration of low-pressure rotor 11 for each speed of rotation N1 of the low-pressure rotor. More generally, this basic model advantageously may be capable of furnishing the frequency and amplitude of vibration of each rotor for each speed of rotation N1 of the low-pressure rotor, for each speed of rotation N2 of the medium-pressure rotor and for each speed of rotation N3 of the high-pressure rotor;
- in step 101, addition of global aerodynamic loads 102 to global model 100;
- in step 103, transformation of the global model to a state space 109, or in other words to a differential equation system, limited to a given portion of the flight range (for example, airplane speed faster than 350 km/h and altitude higher than 6,000 m);
- creation of a numerical model 104 for each damping film (of course, the same model will be used for identical bearings). The created model is a nonlinear model, which advantageously provides that cavitation phenomena occur in the damping film as soon as the pressure at one point drops below a critical cavitation pressure Pc, where Pc=$P_{supply}-P_{ambient}$. It may be a finite elements model or a matrix model or a state space;
- as the case may be, transformation of each created damping film model to a state space, then, in step 105, integration of the model (state space) of the damping film of the said bearing into the model of the turbojet engine within the global model, for each turbojet engine and for each fixed-bracket bearing of the said turbojet engine;
- in step 107, addition of perturbations 106 representative of the gyroscopic effect and of the unbalance of each rotor of the said turbojet engine to each turbojet engine model in the global model;
- use of model 108 created in this way to calculate the vibrations induced in the airplane fuselage by the turbojet engines, and more particularly by the low-pressure rotors of the said turbojet engines.

Numerical model 104 of each damping film is formed from a model, referred to as model without cavitation, which assumes that no gas bubble is formed in the film, and from a model, referred to as model with cavitation, which assumes that a gas bubble corresponding to half of the film, or in other words to an angle π, is formed as soon as the function $$\Gamma(\theta, \varepsilon) = \frac{\varepsilon \cdot \sin\theta}{(1+\varepsilon \cdot \cos\theta)^3}$$

at a point of the film indexed by the angle θ when the axis of the bearing cage is situated at θ=π/2, is greater than a critical value $$\Gamma c = \frac{4 \cdot Pc \cdot C^2}{6 \cdot \mu \cdot L^2 \cdot \Phi},$$

where C is the radial clearance between bearing cage 22 and bearing bracket 23, ε is the eccentricity of the bearing, Pc is the critical cavitation pressure defined in the foregoing, μ is the dynamic viscosity of the fluid (oil), L is the length of the bearing, $\dot{\Phi}$ is the tangential speed of the bearing cage, given by the basic model of the turbojet engine.

Preferably, the models with cavitation and without cavitation of the damping film of each of bearings 17, 18 are formulated by assuming that the axis of the bearing cage undergoes a rotation centered around the axis of the bearing bracket. As a result, for each bearing, the forces, the damping coefficients and the stiffnesses of the damping film of the said bearing are given by the formulas listed in the table presented above. The fluid supply pressure of the damping film appears at two levels in the model with cavitation of the said film, on the one hand under the conditions of occurrence of cavitation phenomena and on the other hand in the formula of the component Ft of the force exerted by the film on the bearing cage.

Figure 4:
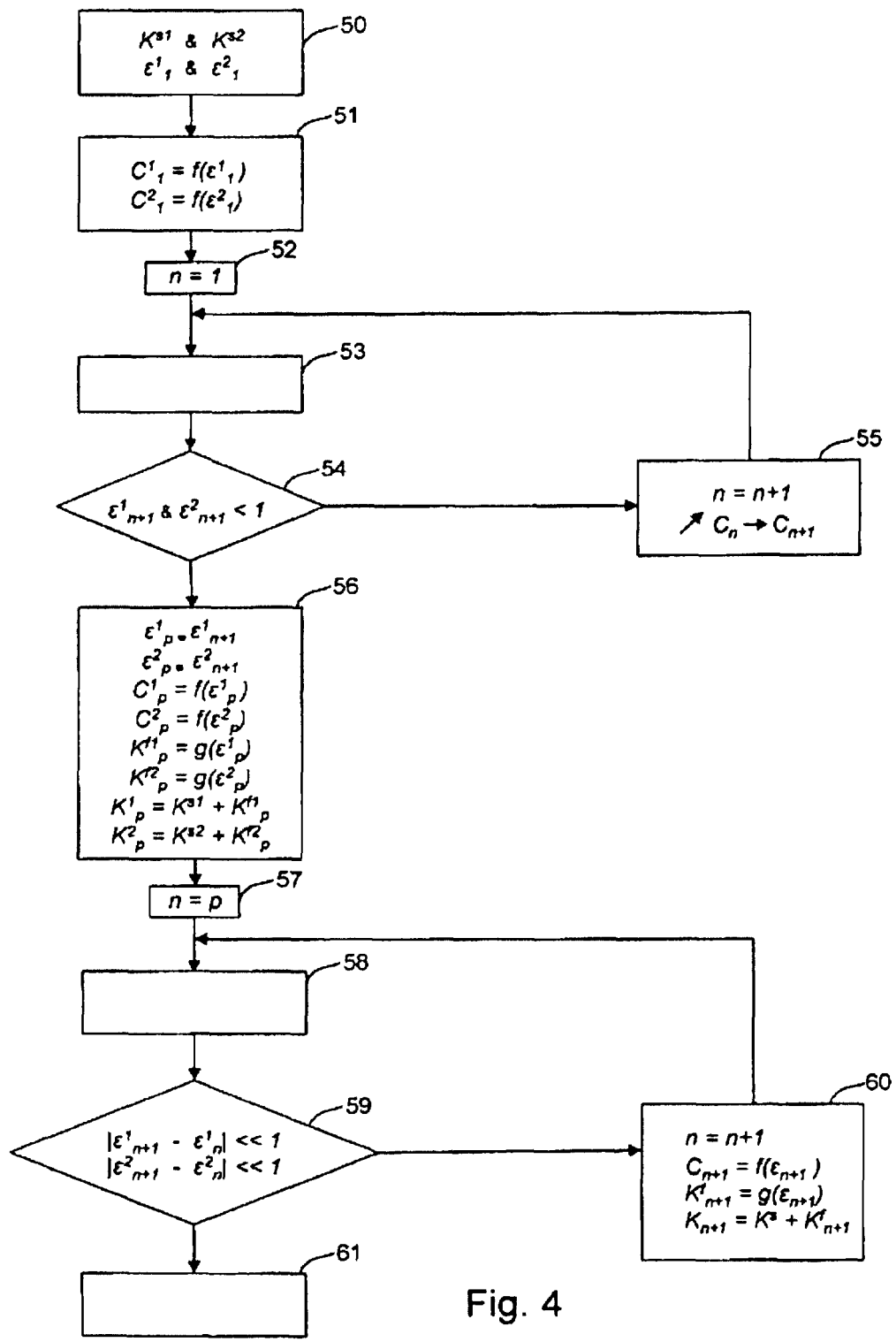
FIG. 4 is a functional flow chart representing part of an embodiment of the method according to the invention.

FIG. 4 illustrates step 105 defined in the foregoing in more detail for a turbojet engine. All of the steps illustrated in this FIG. 4 are executed on the one hand by using the models with cavitation created for the damping films of bearings 17 and 18 of the low-pressure rotor of the said turbojet engine and on the other hand by using the models without cavitation created for the aforesaid damping films.

In step 50, the matrix of stiffnesses $K^{s1}$ (stiffnesses $K_{rr}^{s1}$, $K_{tt}^{s1}$, $K_{rt}^{s1}$, $K_{tr}^{s1}$) of bearing 17 and the matrix of stiffnesses $K^{s2}$ (stiffnesses $K_{rr}^{s2}$, $K_{tt}^{s2}$, $K_{rt}^{s2}$, $K_{tr}^{s2}$) of bearing 18 furnished by the basic model of the turbojet engine are extracted from the global model. Furthermore, an initial value $\epsilon^1_1$ of the eccentricity of bearing 17 and an initial value $\epsilon^2_1$ of the eccentricity of bearing 18 are chosen. For example, the values $\epsilon^1_1$ and $\epsilon^2_1$ may be furnished by the global model.

In step 51, for bearing 17, the matrix $C^1_1$ (coefficients $C^1_{rr,1}$, $C^1_{tt,1}$, $C^1_{rt,1}$, $C^1_{tr,1}$) of the damping coefficients furnished by the model with cavitation of the damping film of the said bearing 17 is calculated for the initial value $\epsilon^1_2$ of the eccentricity of this bearing. Similarly, for bearing 18, the matrix $C^2_1$ (coefficients $C^2_{rr,1}$, $C^2_{tt,1}$, $C^2_{rt,1}$, $C^2_{tr,1}$) of the damping coefficients furnished by the model with cavitation of the damping film of the said bearing 18 is calculated for the initial value $\epsilon^2_1$ of the eccentricity of this bearing. It is to be noted that, taking into account the hypotheses formulated to construct the model with cavitation defined above, only the coefficients $C^1_{tt,1}$ and $C^2_{tt,1}$ are non-zero.

In step 52, a loop for physical verification of the eccentricities of bearings 17 and 18 is started.

In step 53, new values $\epsilon^1_2$ and $\epsilon^2_2$ of the respective eccentricities of bearings 17 and 18 are calculated by means of a model with damping of the turbojet engine and by using the previously calculated matrices $C^1_1$ and $C^2_1$ as damping coefficients of bearings 17 and 18 in this model. The model with damping of the turbojet engine is formulated beforehand from the basic model of the turbojet engine of the global model: it is precisely this basic model if the latter provides that each bearing exerts damping on the rotor; otherwise, the model with damping is formulated from the basic model by modifying the equations of the latter in such a way as to introduce damping at each bearing (the force exerted on the rotor at the bearing is given, in the usual manner, by the matrix $F=K.X+C.\dot{X}$, where X is the displacement vector).

In step 54, these new values $\epsilon^1_2$ and $\epsilon^2_2$ of the eccentricities are compared with the number 1. If one of the bearings, for example bearing 17, exhibits an eccentricity $\epsilon^1_2$ greater than 1 (which is physically impossible), a new matrix $C^1_2$ of the damping coefficients for the said bearing 17 is defined in step 55, by increasing the values of the previously calculated coefficients $C^1_1$. The matrix $C^2_2$ of the damping coefficients of bearing 18 is defined as being equal to the previously calculated matrix $C^2_1$ if the eccentricity $\epsilon^2_2$ of this bearing is smaller than 1 (otherwise the values of the matrix are increased, as explained for bearing 17). Then step 53 is repeated in order to calculate the new values $\epsilon^1_3$ and $\epsilon^2_3$ of the eccentricities of bearings 17 and 18 furnished by the model with damping of the turbojet engine for the matrixes $C^1_1$ and $C^2_2$ of the newly defined damping coefficients. If the value $\epsilon^1_3$ or $\epsilon^2_3$ of the eccentricity of one of the bearings is greater than 1 (step 54), new matrices $C^1_3$ and $C^2_3$ of the damping coefficients are defined (step 55) by increasing the previous values $C^1_2$ or $C^2_2$ of the damping coefficients of the bearing or bearings whose eccentricity is greater than 1, then the new values $\epsilon^1_4$ and $\epsilon^2_4$ of the eccentricities of bearings 17 and 18 furnished by the model with damping of the turbojet engine are calculated for the matrixes $C^1_3$ and $C^2_3$ of the newly defined damping coefficients. This process is repeated until the values $\epsilon^1_{n+1}$ and $\epsilon^2_{n+1}$ of the eccentricities of both bearings 17 and 18 are smaller than 1. The values $\epsilon^1_p$ and $\epsilon^2_p$ (last values calculated) obtained from this physical verification loop are stored in memory.

In step 56, the matrix $C^1_p$ (coefficients $C^1_{rr,p}$, $C^1_{tt,p}$, $C^1_{rt,p}$, $C^1_{tr,p}$) of the damping coefficients and the matrix $K^1_p$ ($K^1_{rr,p}$, $K^1_{tt,p}$, $K^1_{rt,p}$, $K^1_{tr,p}$) of the stiffnesses of bearing 17 are calculated. The matrix $C^1_p$ of the damping coefficients of bearing 17 is equal to the matrix of the damping coefficients of the damping film of the said bearing, furnished by the model with cavitation of the said film for the value $\epsilon^1_p$ of eccentricity of bearing 17 obtained from the previous verification loop. The matrix $K^1_p$ of the stiffnesses of bearing 17 is equal to the sum of the matrix $K^{s1}$ of the stiffnesses of bearing 17 furnished by the basic model of the turbojet engine and the matrix $K^{f1}_p$ of the stiffnesses of the damping film of the said bearing furnished by the model with cavitation of the said film for the value $\epsilon^1_p$ of eccentricity of bearing 17 obtained from the previous verification loop.

In step 57, a loop of convergence of eccentricities of bearings 17 and 18 is started.

In step 18, new values $\epsilon^1_{p+1}$ and $\epsilon^2_{p+2}$ of the respective eccentricities of bearings 17 and 18 are calculated by means of a model with damping of the turbojet engine and by using, in this model, the previously calculated matrices $C^1_p$, $C^2_p$, $K^1_p$ and $K^2_p$ of the damping coefficients and stiffnesses.

In step 59, the convergence of the eccentricities is verified. If, for one of the bearings, for example bearing 17, the difference between the values $\epsilon^1_{p+1}$ and $\epsilon^1_p$ of the eccentricity of the said bearing is not very much smaller that 1, the new matrices $C^1_{p+1}$ of the damping coefficients and $K^{f1}_{p+1}$ of the stiffnesses furnished by the model with cavitation of the damping film of the said bearing are calculated in step 60 for the value $\epsilon^1_{p+1}$ of the eccentricity of the bearing; from this the new matrix $K^1_{p+1}$ of the stiffnesses of bearing 17 is deduced. The matrices $C^2_{p+1}$ of the damping coefficients and $K^2_{p+1}$ of the stiffnesses of bearing 18 are defined as being equal to the previously calculated matrices $C^2_p$ and $K^2_p$ if the difference between the values $\epsilon^2_{p+1}$ and $\epsilon^2_p$ of the eccentricity of this bearing is very much smaller that 1 (otherwise new matrices are calculated by means of the corresponding model with cavitation of the corresponding film, as explained for bearing 17). Then step 58 is repeated in order to calculate the new values $\epsilon e^1_{p+2}$ and $\epsilon^2_{p+2}$ of the eccentricities of bearings 17 and 18 furnished by the model with damping of the turbojet engine for the matrices $C^1_{p+1}$ and $C^2_{p+1}$ of the damping coefficients and for the matrices $K^{f1}_{p+1}$ and $K^2_{p+1}$ of the stiffnesses of the bearings. If the difference between the values $\epsilon^1_{p+2}$ and $\epsilon^1_{+1}$, or between the values $\epsilon_{p+2}$ and $\epsilon^2_{p+1}$, of the eccentricity of one of the bearing is not very much smaller that 1 (step 59), new matrices $C^1_{p+2}$, $K^1_{p+2}$, $C^2_{p+2}$ and $K^2_{p+2}$ are calculated as explained in the foregoing (step 55), then the new values $\epsilon^1_{p+3}$ and $\epsilon^2_{9+3}$ and of the eccentricities of bearings 17 and 18 furnished by the model with damping of the turbojet engine are calculated for these new matrices of damping coefficients and stiffnesses. This process is repeated until the difference between two consecutive calculated values of the eccentricity of the said bearing are very much smaller than 1 for each bearing.

In step 61, the value, referred to as value with cavitation, of the vibration frequency of low-pressure rotor 11 is recorded for each speed of rotation N1 of the low-pressure rotor.

All of steps 50 to 61 illustrated in FIG. 4 are reiterated as explained in the foregoing, but by using the models without cavitation of the damping films of bearings 17 and 18 (instead of the models with cavitation) to calculate the matrices of damping coefficients and stiffnesses. It is to be noted that the stiffnesses are all zero if the models without cavitation were formulated with the hypotheses mentioned above.

In step 61, the value, referred to as value without cavitation, of the vibration frequency of low-pressure rotor 11 is recorded for each speed of rotation N1 of the low-pressure rotor.

The value of the vibration frequency of the low-pressure rotor for each speed N1 of this rotor results from a combination of the previously recorded values with cavitation and without cavitation. This combination depends on diverse parameters, including structural parameters of the turbojet engine, the nature and supply pressure of the oil of the damping film, the flight conditions under consideration, etc. Within the scope of the example that they created, the inventors found that the value of the vibration frequency of low-pressure rotor 11 is equal to the sum of one part ranging between 20% and 40% of the value with cavitation and of a complementary part (and therefore ranging between 60% and 80%) of the value without cavitation, depending on the flight conditions under consideration.

Furthermore, the global model makes it possible to calculate the vibration frequency of the aircraft fuselage according to the vibration frequency of the low-pressure rotor.

Because the invention makes it possible to predict the vibrations induced in the fuselage, it offers the opportunity to employ palliative measures. In particular, the invention makes it possible to dimension each damping film in such a way as to ensure that the rotor or rotors does or do not vibrate at a frequency that induces vibrations in the fuselage corresponding to a natural mode of the said fuselage. In particular, the inventors discovered that the following parameters could have an influence on the frequency of these induced vibrations: fluid supply pressure (which appears in the model with cavitation), length (L) of the bearing, radial clearance (C) between the bearing cage and bearing bracket.

The invention may be the object of numerous variants compared with the illustrated embodiment, so long as these variants fall within the scope defined by the claims.

For example, the method according invention is not limited to triple-spool turbojet engines or to turbojet engines in general. It is applicable to other types of rotating devices, among which electrical generators may be cited.

The invention claimed is:
1. A method for predicting dynamic behavior of an aircraft structure, the aircraft including at least one dimensioning rotating device, whose effect on at least one part of the aircraft structure is to be evaluated, each dimensioning rotating device including one or more rotors, of which at least one rotor is guided in rotation by at least one fixed-bracket bearing, which is provided with a fixed bearing bracket, a conjugate bearing cage inserted inside the bearing bracket and a fluid damping film, confined between the bearing cage and the bearing bracket, the method comprising:

using a numerical global model of the aircraft structure, which comprises, for each dimensioning rotating device, a numerical basic model of the dimensioning rotating device furnishing at least vibration frequency of one rotor of the dimensioning rotating device according to a speed of rotation of the rotor and of perturbations undergone by the rotor;

creating for each fixed-bracket bearing a non-linear numerical model of the damping film of the bearing;

integrating, for each dimensioning rotating device, the model of the damping film of each fixed-bracket bearing of the dimensioning rotating device in the basic model of the dimensioning rotating device to form a numerical model with film, of the dimensioning rotating device in the global model;

applying, in the global model, perturbations to at least one rotor of at least one dimensioning rotating device; and calculating, by the global model, the vibration frequency of at least one rotor of each dimensioning rotating device and the corresponding frequency of the vibrations induced in a part of the aircraft, wherein, to form the model with film of each dimensioning rotating device:

a model with damping of the dimensioning rotating device, capable of furnishing the vibration frequency of at least one analyzed rotor, of the dimensioning rotating device and the eccentricity of each fixed-bracket bearing of this rotor according to the speed of rotation of the analyzed rotor is used, the model with damping being formulated from the basic model of the dimensioning rotating device so as to simulate linear damping at least at each of the fixed-bracket bearings of the analyzed rotor, a value with cavitation of the vibration frequency of the analyzed rotor is calculated for each speed of rotation of the rotor, in the following manner:

for each fixed-bracket bearing of the analyzed rotor, an initial value of the eccentricity of the bearing is chosen, for each fixed-bracket bearing of the analyzed rotor, the matrix of damping coefficients of the damping film of the bearing furnished by the model with cavitation of the damping film is calculated for the chosen initial value of the eccentricity of the bearing, a loop for physical verification of the eccentricities of the fixed-bracket bearing of the analyzed rotor is constructed on the model with damping of the dimensioning rotating device, by using initially, as matrix of damping coefficients of each bearing, the previously calculated matrix of damping coefficients of the corresponding damping film, then increasing the value of these coefficients in each cycle of the loop, until the value of eccentricity of the bearing furnished by the model with damping of the dimensioning rotating device is smaller than 1 for each bearing;

for each fixed-bracket bearing of the analyzed rotor, the matrix of damping coefficients and the matrix of stiffnesses of the damping film of the bearing furnished by the model with cavitation of the damping film are calculated for the value of the eccentricity of the bearing established at the end of the physical verification loop, a loop of convergence of the eccentricities of the fixed-bracket bearings of the analyzed rotor is constructed on the model with damping of the dimensioning rotating device, by using initially; as matrix of the damping coefficients of each bearing, the previously calculated matrix of damping coefficients of the damping film of the bearing and, as matrix of stiffnesses of each bearing, the sum of the matrix of stiffnesses of the bearing furnished by the basic model of the dimensioning rotating device and of the previously calculated matrix of stiffnesses of the damping film of the said bearing, then by replacing these matrices in each cycle of the loop respectively by the matrix of damping coefficients of the damping film of the bearing furnished by the model with cavitation of the film for the value of eccentricity of the bearing established in the preceding cycle, and by the sum of the matrix of stiffnesses of the bearing furnished by the basic model of the dimensioning rotating device and the matrix of stiffnesses of the damping film of the said bearing furnished by the model with cavitation of the film for the value of eccentricity of the bearing established in the preceding cycle, and so on until the value of eccentricity furnished for each bearing by the model with damping of the dimensioning rotating device converges;

the value with cavitation of the vibration frequency of the analyzed rotor furnished by the model with damping of the dimensioning rotating device at the end of the convergence loop is recorded for each speed of rotation of the rotor;

similarly, a value without cavitation of the vibration frequency of the analyzed rotor is calculated for each speed of rotation of the rotor;

to calculate the value of the vibration frequency of the analyzed rotor for each speed of rotation of the rotor, a percentage of the value with cavitation of the previously calculated vibration frequency and a complementary percentage of the value without cavitation of the previously calculated vibration frequency are added.

2. A method according to claim 1, wherein the applied perturbations comprise perturbations representative of a gyroscopic effect and of unbalance of each rotor of the dimensioning rotating device.

3. A method according to claim 1, wherein:
the global model and the basic model of each dimensioning rotating device used are initially finite elements models, and each created damping film model is initially a matrix model or a finite elements model or a state space, and each of the models is transformed into state spaces before the model with film of each dimensioning rotating device is formed in the global model transformed into the state space.

4. A method according to claim 1, wherein, for each damping film of each dimensioning rotating device, a value to be imposed on at least one parameter of the damping film or of the corresponding bearing is determined according to a speed of rotation of at least one rotor of the dimensioning rotating device, so as to prevent frequency of vibrations induced in the part of the aircraft structure from coinciding with a natural mode of the part, the parameter being chosen from among the following parameters: fluid supply pressure of the damping film; length of the bearing; radial clearance between the bearing cage, and the bearing bracket.

5. A method according to claim 1, wherein each damping film model assumes the following:
fluid is Newtonian, without inertia, incompressible and of homogeneous viscosity;
the damping film is modeled by a plane film,
eccentricity of the bearing is considered to be the same over an entire length of the bearing,
every displacement of the bearing cage is resolved into a radial component and a tangential component; the radial component of a displacement of the bearing cage is modeled by a displacement along an axis normal to the plane of the modeled film; the tangential component of a displacement of the bearing cage is modeled by a sliding along an axis contained in the plane of the modeled film.

6. A method according to claim 1, wherein each damping film model assumes that cavitation phenomena may occur.

7. A method according to claim 6, wherein, to create each damping film model, one model without cavitation, which assumes that no cavitation phenomenon is occurring, and one model with cavitation, which assumes that cavitation phenomena are occurring, the following are assumed:

because of unbalance of the rotor or rotors carried by the bearing, the axis of the bearing cage is eccentric relative to the axis of the bearing bracket and it undergoes rotation centered around the axis of the bearing bracket, such that the radial component $\dot{\epsilon}$ of the speed of the bearing cage is considered to be zero, in the model with cavitation, every aforesaid negative pressure value is replaced by zero, in the model with cavitation, a gas bubble is formed over half of the film, or in other words over an angle equal to $\pi$ diametrically opposite the axis of the bearing cage, as soon as the function $$\Gamma(\theta, \varepsilon) = \frac{\varepsilon \cdot \sin\theta}{(1 + \varepsilon \cdot \cos\theta)^3}$$

at a point of the film indexed by the angle $\theta$ when the axis of the bearing cage is situated at $\theta = \pi/2$, is greater than a critical value $$\Gamma c = \frac{4 \cdot Pc \cdot C^2}{6 \cdot \mu \cdot L^2 \cdot \dot{\Phi}},$$

where C is the radial clearance between the bearing cage and the bearing bracket, $\epsilon$ is the ratio, as eccentricity of the bearing, of the distance separating, at instant t, the axis of the bearing cage and the axis of the bearing bracket over the radial clearance C between the bearing cage and the bearing bracket, Pc is the critical cavitation pressure, equal to the fluid supply pressure of the damping film minus the ambient pressure, $\mu$ is the dynamic viscosity of the fluid, L is the length of the bearing, $\dot{\Phi}$ is the tangential speed of the bearing cage, given by the base model of the dimensioning rotating device, taking the above assumptions into account, the forces exerted by the damping film on the bearing cage, as well as the stiffnesses and damping coefficients of the damping film, are given by the following formulas:

| | model without cavitation | model with cavitation |
|---|---|---|
| $F_r$ | 0 | $\dfrac{R \cdot L^3 \cdot \mu}{C^3} \dfrac{2 \cdot \varepsilon^2 \cdot \dot{\Phi}}{(1 - \varepsilon^2)^2}$ |
| $F_t$ | $\dfrac{\pi \cdot R \cdot L^3 \cdot \mu}{C^2} \dfrac{\varepsilon \cdot \dot{\Phi}}{(1 - \varepsilon^2)^{3/2}}$ | $\dfrac{R \cdot L^3 \cdot \mu}{C^3} \dfrac{\pi \cdot \varepsilon \cdot \dot{\Phi}}{2 \cdot (1 - \varepsilon^2)^{3/2}} + Fs$ |

-continued

| | model without cavitation | model with cavitation |
|---|---|---|
| $C_{rr}$ | 0 | 0 |
| $C_{tt}$ | $\dfrac{\pi}{(1-\varepsilon^2)^{3/2}}$ | $\dfrac{\pi}{2\cdot(1-\varepsilon^2)^{3/2}}$ |
| $C_{rt}$ | 0 | $\dfrac{2\cdot\varepsilon}{(1-\varepsilon^2)^2}$ |
| $C_{tr}$ | 0 | 0 |
| $K_{rr}$ | 0 | $\dfrac{2\cdot\varepsilon\cdot\Phi}{(1-\varepsilon^2)^2}$ |
| $K_{tt}$ | 0 | 0 |
| $K_{rt}$ | 0 | 0 |
| $K_{tr}$ | 0 | 0 | where Fs is a force relative to the fluid supply pressure of the damping film.

8. A non-transitory computer readable medium storing computer executable instructions permitting employment of a method according to claim 1 when the instructions are executed in an information technology system.

9. An information technology system, comprising means to employ a method according to claim 1.

* * * * *